US008832156B2

(12) United States Patent
Heil et al.

(10) Patent No.: US 8,832,156 B2
(45) Date of Patent: Sep. 9, 2014

(54) DISTRIBUTED COMPUTING MANAGEMENT

(75) Inventors: Andreas Heil, Linkenheim (DE); Martin Calsyn, Cambridge (GB); Alexander Brandle, Cambridge (GB); Vassily Lyutsarev, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 551 days.

(21) Appl. No.: 12/484,773

(22) Filed: Jun. 15, 2009

(65) Prior Publication Data

US 2010/0318565 A1 Dec. 16, 2010

(51) Int. Cl.
*G06F 17/30* (2006.01)

(52) U.S. Cl.
CPC .................. *G06F 17/30958* (2013.01)
USPC ........................... 707/798; 707/803

(58) Field of Classification Search
CPC ................................ G06F 17/30958
USPC ................................ 707/798, 803
See application file for complete search history.

(56) References Cited

U.S. PATENT DOCUMENTS

| | | | | |
|---|---|---|---|---|
| 5,551,037 | A * | 8/1996 | Fowler et al. | 719/313 |
| 5,966,072 | A * | 10/1999 | Stanfill et al. | 340/440 |
| 7,174,370 | B1 * | 2/2007 | Saini et al. | 709/220 |
| 7,614,037 | B2 * | 11/2009 | Gavrilov | 717/105 |
| 7,773,558 | B2 * | 8/2010 | Cho et al. | 370/329 |
| 7,937,704 | B2 * | 5/2011 | McKee | 718/102 |
| 8,229,968 | B2 * | 7/2012 | Wang et al. | 707/798 |
| 8,239,404 | B2 * | 8/2012 | Zhou et al. | 707/769 |
| 8,537,160 | B2 * | 9/2013 | Hargrove et al. | 345/440 |
| 8,645,429 | B1 * | 2/2014 | Bik et al. | 707/798 |
| 2006/0075407 | A1 * | 4/2006 | Powers et al. | 718/100 |
| 2006/0112123 | A1 | 5/2006 | Clark et al. | |
| 2007/0100961 | A1 | 5/2007 | Moore | |
| 2008/0028300 | A1 | 1/2008 | Krieger et al. | |
| 2008/0250329 | A1 | 10/2008 | Stefik et al. | |
| 2008/0276252 | A1 | 11/2008 | Pronovost et al. | |

(Continued)

OTHER PUBLICATIONS

Bethel, et al., "VACET: Proposed SciDAC2 Visualization and Analytics Center for Enabling Technologies", retrieved on Apr. 8, 2010 at <<http://www.sci.utah.edu/~csilva/papers/VACET_SciDAC06_LBNL-60413.pdf>>, Journal of Physics: Conference Series, vol. 46, No. 1, 2006, pp. 561-569.

(Continued)

*Primary Examiner* — Shahid Alam
*Assistant Examiner* — Nargis Sultana
(74) *Attorney, Agent, or Firm* — Pablo Tapia; Jim Ross; Micky Minhas

(57) ABSTRACT

Management of distributed computing systems is required, for example, to carry out activities using shared resources such as computational tasks, in-silico experiments and other tasks. In an embodiment a distributed computing graph represents processes executing in the distributed computing system in order to carry out the activity and this graph is available to entities in the distributed computing system. For example, a user interface at an entity in the distributed computing system enables a user to view a local representation of the distributed computing graph and to control the activity using that local representation which maps dynamically to and from the underlying distributed computing graph. In examples, the local representation of the distributed computing graph enables live control of the activity without the need for compilation. In examples the distributed computing graph is shared through the distributed computing system using peer-to-peer distribution or using a replication mechanism.

19 Claims, 12 Drawing Sheets

(56) References Cited

U.S. PATENT DOCUMENTS

| | | | |
|---|---|---|---|
| 2009/0063998 A1 | 3/2009 | Huang et al. | |
| 2009/0157590 A1 | 6/2009 | Mijares et al. | |
| 2009/0249004 A1* | 10/2009 | Wang et al. | 711/162 |
| 2009/0276771 A1 | 11/2009 | Nickolov et al. | |
| 2009/0313331 A1 | 12/2009 | Rasmussen et al. | |
| 2009/0327302 A1 | 12/2009 | Richardson et al. | |
| 2012/0209886 A1* | 8/2012 | Henderson | 707/798 |
| 2013/0311507 A1* | 11/2013 | Kementsietsidis et al. | 707/769 |
| 2013/0311517 A1* | 11/2013 | Kementsietsidis et al. | 707/798 |
| 2014/0019490 A1* | 1/2014 | Roy et al. | 707/798 |

OTHER PUBLICATIONS

Brodlie, et al., "Distributed and Collaborative Visualization", retrieved on Apr. 8, 2010 at <<http://www.comp.leeds.ac.uk/vvr/gViz/publications/CGF_dcvstar.pdf>>, The Eurographics Association and Blackwell Publishing, Computer Graphics Forum, vol. 23, No. 2, 2004, pp. 223-251.

Kumar, et al., "IFLOW: Resource-Aware Overlays for Composing and Managing Distributed Information Flows", retrieved on Apr. 8, 2010 at <<http://www.cc.gatech.edu/systems/papers/schwan/Kumar05IFL.pdf>>, ACM, Proceedings of EuroSys, Leuven, BE, Apr. 18, 2006, pp. 1-14.

Mishchenko, et al., "Distributed Visualization Framework Architecture", retrieved on Apr. 8, 2010 at <<ftp://ftp.cse.ohio-state.edu/pub/tech-report/2008/TR20.pdf>>, IEEE Transactions on Visualization and Computer Graphics, vol. 14, No. 6, 2008, pp. 1173-1180.

Neophytou, et al., "WhiteBoard P2P: A Peer-to-Peer Reliable Data Dissemination Infrastructure for Collaborative Applications", retrieved on Apr. 12, 2010 at <<http://www.cs.pittedu/~panickos/publications/conference/wbp2p-isyc06.pdf>>, International Conference on Intelligent Systems and Computing: Theory And Applications (ISYC), Ayia Napa, CY, Jul. 2006, pp. 317-326.

Preston, et al., "Simulation-based Architectural Design and Implementation of a Real-time Collaborative Editing System", retrieved on Apr. 12, 2010 at <<http://delivery.acm.org/10.1145/1410000/1404730/p320-preston.pdf?key1=1404730&key2=0816601721&coll=GUIDE&dl=GUIDE&CFID=75646207&CFTOKEN=10570869>>, Society for Computer Simulation Intl, Proceedings of the Spring Simulation Multiconference, vol. 2, Norfolk, VA, 2007pp. 320-327.

Zhang, "OptiStore: An On-Demand Data Processing Middleware for Very Large Scale Interactive Visualization", retrieved on Apr. 8, 2010 at <<http://snorky.evl.uic.edu/files/pdf/OptiStore.Thesis.pdf>>, University of Illinois at Chicago, Doctoral Thesis, 2007, pp. 1-173.

"2020 Science", retrieved on May 8, 2009 at <<http://research.microsoft.com/en-us/um/cambridge/projects/towards2020science/downloads/T2020S_Report.pdf, Microsoft Corporation 2006, 43 pages.

Adams, et al., "Understanding height-structured competition in forests: is there an R for light?", retrieved on May 8, 2009 at <<http://www.ph.ed.ac.uk/~s0676158/pdf/adams_etal_07.pdf>>, Proceedings of the Royal Society B (2007) 274, pp. 3039-3047, published online Oct. 10, 2007.

"Amazon Simple Storage Service Developer Guide", retrieved on May 12, 2009 at <<http://docs.amazonwebservices.com/AmazonS3/2006-03-01/>>, Apr. 9, 2009, 4 pages.

Belhajjame, "Semantic Replaceability of eScience Web Services", retrieved on May 8, 2009 at 21 <http://ieeexplore.ieee.org/stamp/stamp.jsp?arnumber=04426918>>, Third IEEE International Conference on e-Science and Grip Computing, IEEE 2007, pp. 449-456.

De Roure, et al., "myExperiment-A Web 2.0 Virtual Research Environment", retrieved on May 8, 2009 at <<http://eprints.ecs.soton.ac.uk/13961/1/myExptVRE31.pdf, 4 pages.

"ESSE Visualization Plugin for NASA World Wind", retrieved on May 12, 2009 at <<http://www.codeplex.com/VisualEsse>>, May 6, 2007, 1 page.

"Excel Home Page—Microsoft Office Online", retrieved on May 12, 2009 at <<http://office.microsoft.com/en-us/excel/FX100487621033.aspx>>, Microsoft Corporation 2009, 1 page.

Freeman, et al., "Cyberinfrastructure for Science and Engineering: Promises and Challenges", retrieved on May 8, 2009 at <<http://ieeexplore.ieee.org/stamp/stamp.jsp?tp=&isnumber=&arnumber=1398020, from the Proceedings of the IEEE, vol. 93, No. 3, Mar. 2005, pp. 682-691.

Gu, et al., "Falcon: On-line Monitoring and Steering of Parallel Program", retrieved on May 8, 2009 at <<http://citeseerx.ist.psu.edu/viewdoc/download?doi=10.1.1.53.3989&rep=rep1&type=pdf>>, Submitted to the IEEE TPDS—Nov. 1994, Revised Sep. 1995, pp. 1-46.

Hart, et al., "Interactive Visual Exploration of Distributed Computations", retrieved on May 8, 2009 at <<http://citeseerx.ist.psu.edu/viewdoc/download?doi=10.1.1.27.5278&rep=rep1&type=pdf>>, Department of Computer Science Washington University in Saint Louis, 7 pages.

Heikkinen, et al., "Methods and uncertainties in bioclimatic envelope modelling under climate change", retrieved on May 8, 2009 at <<http://www.mncn.csic.es/pdf_web/maraujo/Heikkinen_et_al_PPG2006.pdf>>, Progress in Physcial Geography 30, 6 (2006), pp. 1-27.

Heil, "LCARS—The Next Generation Programming Context", retrieved on May 8, 2009 at <<http://delivery.acm.org/10.1145/1150000/1145711/p29-heil.pdf?key1=1145711&key2=9111912421&coll=GUIDE&dl=GUIDE&CFID=34321032&CFTOKEN=41524811>>, AVI 2006, May 23, 2006, Venice, Italy, pp. 29-31.

Hey, et al., "Cyberinfrastructure for e-Science", retrieved on May 12, 2009 at <<http://www.sciencemag.org/cgi/content/abstract/308/5723/817>>, Science Magazine, May 6, 2005, vol. 38, No. 5723, 2 pages.

Hey, et al., "The Data Deluge: An e-Science Perspective", retrieved on May 8, 2009 at <<http://www.rcuk.ac.uk/cmsweb/downloads/rcuk/research/esci/datadeluge.pdf>>, To be Published in Grip Computing-Making the Global Infrastructure a Reality, Wiley, Jan. 2003, pp. 1-17.

Hey, et al., "The UK e-Science Core Programme and the Grid", retrieved on May 8, 2009 at <<http://eprints.ecs.soton.ac.uk/7644/1/UKeScienceCoreProg.pdf>>, Future Generation Computer Systems 18 (2002) pp. 1017-1031.

Hinckley, et al., "InkSeine: In Situ Search for Active Note Taking", retrieved on May 8, 2009 at <<http://research.microsoft.com/en-us/um/people/kenh/papers/InkSeine-CHI2007.pdf>>, CHI 2007, Apr. 28-May 3, 2007, San Jose, CA., 10 pages.

Hornik, "R FQA—Frequently Asked Questions on R", retrieved on May 12, 2009 at <<http://CRAN.R-project.org/doc/FAQ/R-FAQ.html>>, Version 2.9.2009-04-28, 130 pages.

Hull, et al., "Taverna: a tool for building and running workflows of services", retrieved on May 12, 2009 at <<http://nar.oxfordjournals.org/cgi/content/full/34/suppl_2/W729>>, Nucleic Acids Research 2006 34 (Web Server issue): 11 pages.

Kaugars, et al., "PARVIS: Visualizing Distributed Dynamic Partioning Algorithms", retrieved on May 8, 2009 at <<http://citeseerx.ist.psu.edu/viewdoc/download;jsessionid=558A2D24E991550A7BC92A2E4BFCE81B?doi=10.1.1.43.5962&rep=rep1&type=pdf>>, Department of Computer Science, Western Michigan University, MI, 7 pages.

Lesk, "Online Data and Scientific Progress: Content in Cyberinfrastructure", 2004.

Lopez-Benitez, et al., "Simulation of Task Graph Systems in Heterogeneous Computing Environments", retrieved on May 12, 2009 at <<http://ieeexplore.ieee.org/stamp/stamp.jsp?arnumber=765116&isnumber=16539>>, Department of Computer Science, College of Engineering, Texas Tech University, 13 pages.

"Microraptor: A Distributed Process Management and Control System", retrieved on May 12, 2009 at <<http://www.microraptor.org/ >>, Jan. 12, 2007, 2 pages.

"MM5 Community Model", retrieved on May 12, 2009 at <<http://www.mmm.ucar.edu/mm5>>, 1 page.

(56) References Cited

OTHER PUBLICATIONS

Muggleton, "Exceeding Human Limits", retrieved on May 8, 2009 at <<http://dev.pubs.doc.ic.ac.uk/mugg-limits/mugg-limits.pdf, Nature Publishing Group, vol. 440, Mar. 23, 2006, pp. 409-410.

"myExperiment", retrieved on May 8, 2009 at <<http://www.myexperiment.org/>>, The University of Manchester and University of Southampton, 2007-2008, 4 pages.

"myExperiment: Social Networking for Workflow-using eScientists", retrieved on May 8, 2009 at <<http://eprints.ecs.soton.ac.uk/15095/1/Works112v-goble2.pdf>>, Works 2007, Jun. 25, 2007, Monterey, CA., 2 pages.

"Nasa World Wind", retrieved on May 12, 2009 at <<http://worldwind.arc.nasa.gov>>, 2 pages.

Purves, et al., "Crown Plasticity and Competition for Canopy Space: A New Spatially Implicit Model Parameterized for 250 North American Tree Species", retrieved on May 12, 2009 at <<http://research.microsoft.com/apps/pubs/default.aspx?id=68031>>, Jan. 2007, 1 page.

Rose, et al., "Plasma: a graph based distributed computing model", retrieved on May 8, 2009 at <<http://rosejn.net/publications/plasma_graphs.pdf>>, University of Lugano Faculty of Informatics, Switzerland, pp. 1-6.

Russell, et al., "The Cost Structure of Sensemaking", retrieved on May 8, 2009 at <<http://delivery.acm.org/10.1145/170000/169209/p269-russell.pdf?key1=169209&key2=8911912421&coll=GUIDE&dl=GUIDE&CFID=34321171&CFTOKEN=99489322, Interchi 1993, Apr. 24-29, pp. 269-276.

Shanahan, et al., "Amazon.com Mashups", retrieved on May 12, 2009 at <<http://www.amazon.com/Amazon-com-Mashups-Francis-Shanahan/dp/0470097779>>, 10 pages.

Smith, "Monitoring Ecosystems the High-tech Way", Computer World, Canada, Mar. 7, 2009.

"Taverna Project Website", retrieved on May 12, 2009 at <<http://taverna.sourceforge.net/>>, 1 page.

Walker, et al., "An Instrumentation System for Post-Mortem Visualization of Distributed Algorithm", retrieved on May 8, 2009 at <<http://ieeexplore.ieee.org/stamp/stamp.jsp?arnumber=592231&isnumber=12954, IEEE 1997, pp. 684-687.

Weis, et al., "Rapid Prototyping for Pervasive Applications", retrieved on May 8, 2009 at <<http://ieeexplore.ieee.org/stamp/stamp.jsp?tp=&arnumber=4160609>>, Pervasive Computing, Published by the IEEE Computer Society, 2007, pp. 76-84.

Zhao, et al., "Distributed execution of aggregated multi domain workflows using an agent framework", retrieved on May 8, 2009 at <<http://ieeexplore.ieee.org/stamp/stamp.jsp?arnumber=04278795>>, 2007 IEEE Congress on Services (Services 2007), 8 pages.

Zhao, et al., "Swift: Fast, Reliable, Loosely Coupled Parallel Computation", retrieved on May 8, 2009 at <<http://www.ci.uchicago.edu/swift/papers/Swift-SWF07.pdf>>, to appear: 2007 IEEE International Workshop on Scientific Workflows, Salt Lake City, Utah, 9 pages.

Zhizhin, et al., "Environmental Scenario Search and Visualization", retrieved on May 8, 2009 at <<http://esse.wdcb.ru/papers/EnvironmentalScenarioSearchAndVisualization.pdf>>, ACM GIS 2007, Nov. 7-9, 2007, Seattle, WA., 10 pages.

Strigul, et al., "Scaling From Trees to Forests: Tractable Macroscopic Equations for Forest Dynamics", Ecological Monographs, vol. 78 (4); Ecological Society of America, Nov. 1, 2008, pp. 523-545.

* cited by examiner

Before

After

DISTRIBUTED COMPUTING MANAGEMENT

BACKGROUND

Management of distributed computing systems is required in many application domains. For example, computational science, management of distributed database systems, management of distributed computing systems for bio-informatics, image analysis, or other applications in which very large amounts of data are to be processed or huge amounts of computational resources are required.

The use of distributed computing systems is becoming more widespread. Often computational tasks are decomposed into multiple subtasks which are executed on different computing systems or computational tasks are divided into fragments and the fragments are spread over multiple systems to be computed. Management of these distributed computing systems is typically carried out by a single entity which "owns" the computational task and there is a general need to simplify and improve the manner in which the management is achieved. For example, existing tools to manage scientific workflows enable a scientist to make use of remote computing resources to carry out in-silico experiments. However, it is difficult to enable the experiments to be managed by multiple users working on different computers at the same time in a simple and effective manner. In addition, existing approaches are often unsuited to novice users who have little or no knowledge of remote computing resources that may be used.

Existing software tools are available to manage scientific workflows which may use components on both remote and local machines in distributed computing systems. The workflows enable the specification and execution of ad-hoc in-silico experiments using informatics resources. Such a workflow-based approach allows scientists to describe and carry out their experimental processes in a structured, repeatable and verifiable way. There is a desire to improve the functionality of such software tools such that management of distributed computing systems is facilitated.

The embodiments described below are not limited to implementations which solve any or all of the disadvantages of known distributed computing management systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Management of distributed computing systems is required, for example, to carry out activities using shared resources such as computational tasks, data processing tasks, in-silico experiments and other tasks. In an embodiment a distributed computing graph represents processes executing in the distributed computing system in order to carry out the activity and this graph is available to entities in the distributed computing system. For example, a user interface at an entity in the distributed computing system enables a user to view a local representation of the distributed computing graph and to control the activity using that local representation which maps dynamically to and from the underlying distributed computing graph. In examples, the local representation of the distributed computing graph enables live control of the activity without the need for compilation. In examples the distributed computing graph is shared through the distributed computing system using peer-to-peer distribution or using a replication mechanism.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a distributed computing system for computational science, the system described is provided as an example and not a limitation. As those skilled in the art will appreciate, the present examples are suitable for application in a variety of different types of distributed computing systems.

Figure 1:
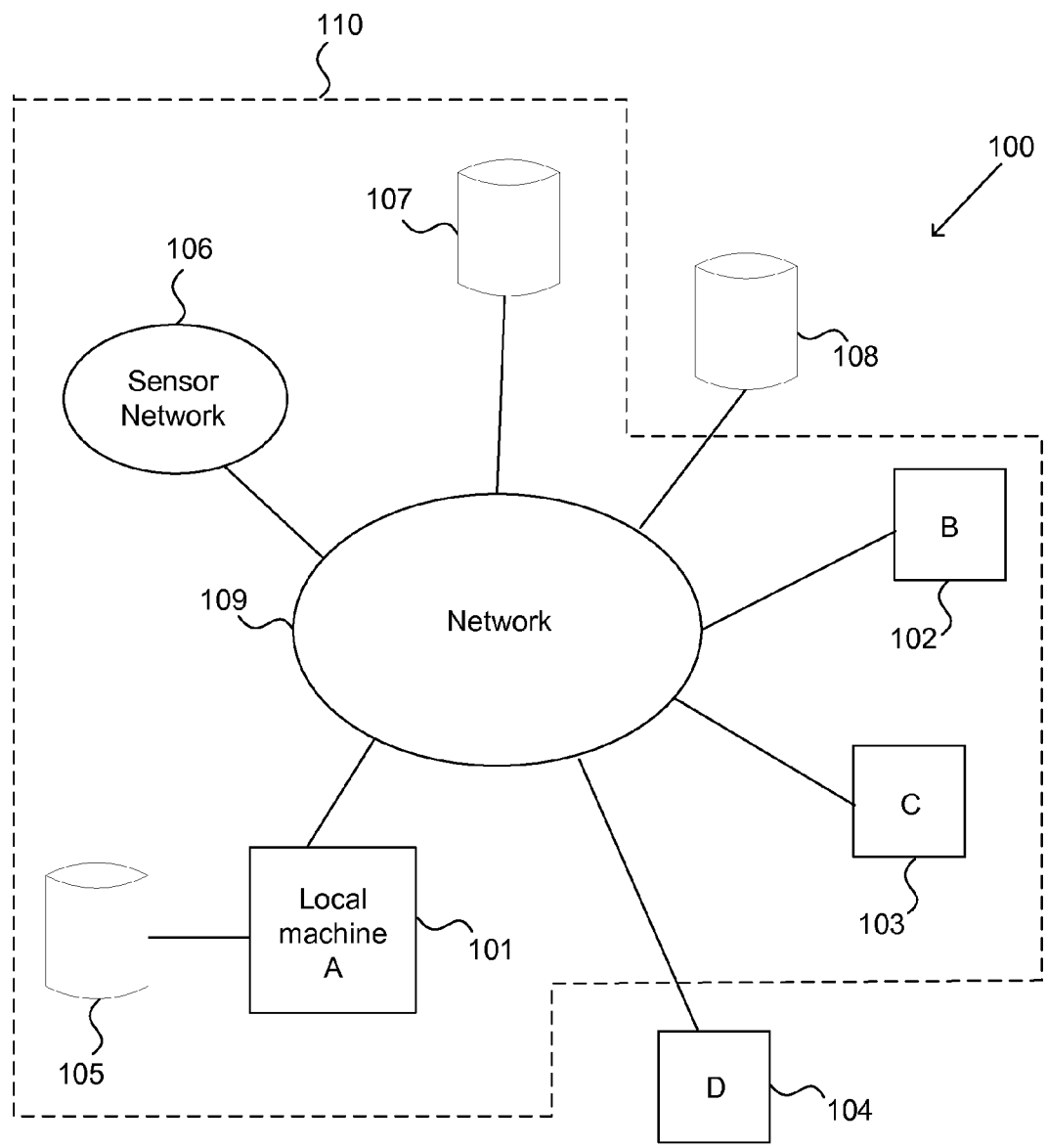
FIG. 1 is a schematic diagram of a distributed computing system in which embodiments of the invention may be implemented.

FIG. 1 is a schematic diagram of a distributed computing system in which embodiments of the invention may be implemented. It comprises a network 109 which is any communications network which enables data to be transferred between entities 101-109 in that network. Many more entities may be present although FIG. 1 illustrates only 8 entities for clarity. An entity in the distributed computing system may comprise a physical processor such as personal computer, super computer or other processor (multi-core processor or single core).

An entity in the distributed computing system may also be a logical construct such as a plurality of physical machines that appear to a user as one logical unit. It is also possible for an entity in the distributed computing system to be a virtual system such as a virtual personal computer or any other computing device. Some of the entities in the distributed computing system may provide access to data; for example, these may be databases 105, 107, 108 and/or may be sensor networks 106 which actively sense data.

The entities in the distributed computing system are arranged to enable activities to be carried out in the distributed computing system under the control of one or more distributed computing graphs. An activity is one or more tasks which are associated with an aim or objective. For example, the activity may be an experiment, a data centre management task, a computational computing objective or other group of tasks associated with an objective. Each activity has an associated distributed computing graph which controls entities in the distributed computing system in order to carry out the activity. For example, this is achieved by assigning tasks to graphs. Entities in the distributed computing system are aware of the distributed computing graph and this is achieved in any suitable manner. For example, the distributed computing graph may be replicated at the entities. It is also possible for the distributed computing graph to be shared amongst the entities using a peer-to-peer distribution system of any suitable type. As described in more detail below, each entity has a local view of the distributed computing graph and is aware of communication protocols, addresses and contracts associated with the tasks assigned to the distributed computing graph.

The term "distributed computing graph" is used to refer to a data structure storing a plurality of nodes connected by links where each node represents a process at a specified entity in a distributed computing system. For example, the process may be a computational process which takes data from one or more sources (which could also be other tasks) and produces output. It is also possible for the process to be one which retrieves data from a source and reformats or pre-processes that data so that it is suitable for a later computation process. In this case the data sourc(es) are specified at the node representing the process. Entities in the distributed computing system are arranged to carry out the represented processes (which may be parallel, concurrent or sequential) using the specified entities and data sources. Each distributed computing graph is associated with an activity as described above.

In an example, a data source such as a text file exists on a local machine operated by a user. The user is able to create or modify a local view of a distributed computing graph using the user interface 301 to add a task. This is achieved by connecting a node representing the text file to one or more other nodes representing other entities in the distributed computing system and in this way a task is added to the graph. For example, these other entities may comprise a remote web service. The edge in the graph created between the text file node and the web service node may be implemented using a SOAP call to the web service to send the text file data to the web service for processing. However, this is not essential, any suitable method of implementing the edge in the graph may be used. Another task may then be added to the local view of the distributed computing graph. For example, this task may be a local executable file which is added as a node to the local view by connecting it to the node representing the web service. This connection may be implemented using a SOAP call to the web service to pull the processed text file data from the web service. Another task may be created and a node representing it connected to the node representing the executable file. This newly added task may represent a file comprising the pulled data and is interpreted as a file by the distributed computing system. In this way a file system is effectively used to perform the task making use of remote web service. The file system and web service are examples only and may be substituted by any other suitable technology. For example, databases, custom executable files for computational tasks, reading and writing to and from files.

Within the distributed computing system tasks are able to notify each other. This is implemented using any suitable notification mechanism, for example, using push and pull notification mechanisms or publish and subscribe mechanisms. Once a task is completed, for example, the web service call is finished in the above example, the local representation of the task within the graph engine 303 actively sends out (to all entities in the distributed computing system) a notification to indicate this using the particular notification mechanism being used.

Any suitable methods may be used to enable the tasks and the local graph nodes to communicate. For example, an application programming interface is provided to the graph engine 303. This may be used by a programmer to link a task to a local graph item. For example, the application programming interface provides a set of contracts and communication mechanisms to be used by local representations of tasks (in the local views) to communicate with one another in the distributed computing system. In this way the local view of a task may be thought of as a wrapper which enables a task to talk to one or more other graph items. Thus task events such as task notification, task error, task completion may be communicated to other graph items. Whether two tasks are able to communicate may be specified by details in the wrappers.

In some embodiments one or more communities are specified in the distributed computing system although this is not essential. For example, the entities within the dotted line 110 in FIG. 1 may be considered as forming a community. For example, a scientist may require to carry out a new experiment and may set up a community comprising users, resources and data. The users may comprise the scientist and his or her assistant. The resources may comprise the scientist's research computer, home computer, laptop and the assistant's research computer. The scientist specifies one or more data sources. The scientist may belong to a plurality of different communities. In the example of FIG. 1, database 108 and entity 104 are outside the community 110 and are unable to access any resources of the community. However, entities within the community may be able to access database 108 and entity 104 outside the community by using appropriate credentials or in other manners.

Figure 2:
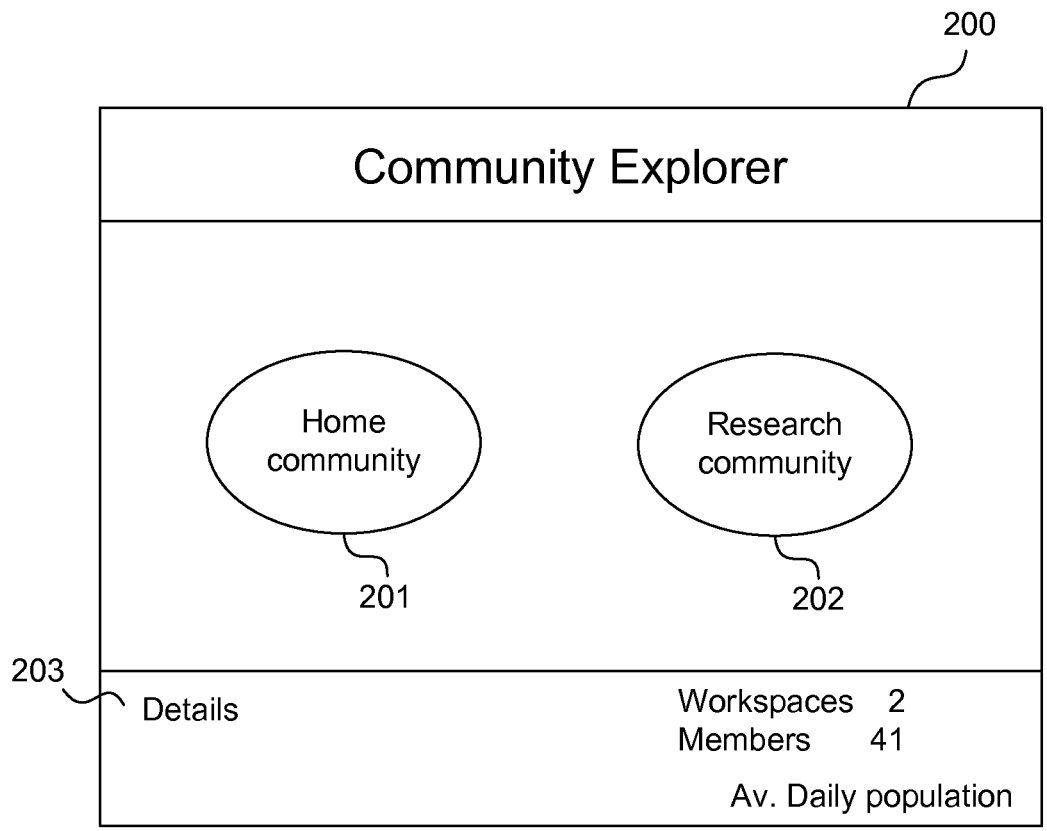
FIG. 2 is a schematic diagram of a user interface display at an entity in the distributed computing system of FIG. 1.

An entity in the distributed computing system may comprise a user interface which provides a facility to view and modify communities. For example, FIG. 2 shows an example user interface display 200 which may be provided at local machine A 101 of FIG. 1 for example. In this example, the user at local machine A is a member of two communities 201, 202 which are illustrated schematically. The user interface display provides details 203 about the communities such as the number of members in a community, the number of workspaces a given community has, and an average daily population of active members in the community. A workspace is associated with one or more activities (such as an experiment or other computational computing activity) and a given community may comprise one or more workspaces. Each activity has its own distributed computing graph and is able to access all resources within its associated community. A distributed computing graph is limited to the scope of its associated activity and so is not part of two different activities.

Figure 3:
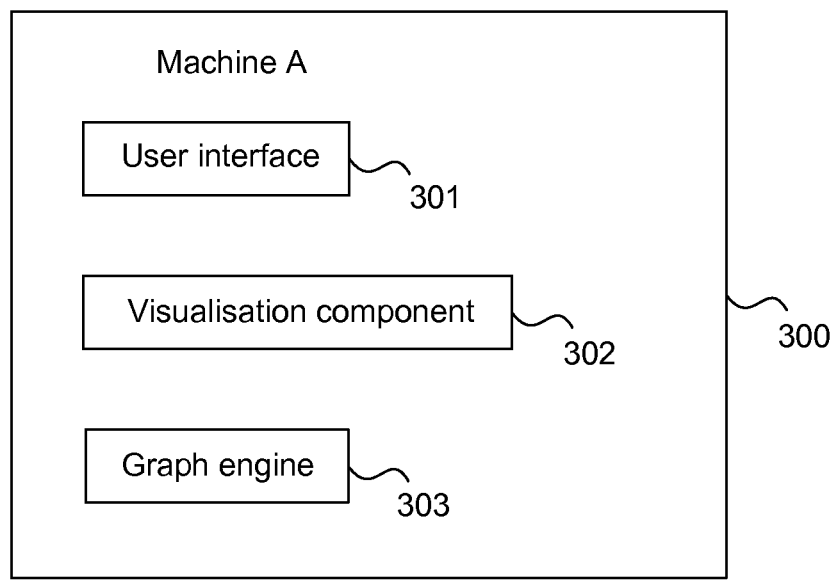
FIG. 3 is a schematic diagram of an entity in the distributed computing system of FIG. 1.

FIG. 3 is a schematic diagram of an entity in the distributed computing system 100 of FIG. 1 in more detail. The entity, such as local machine A 101 comprises a user interface 301; a graph engine 303 and optionally a visualization component 302. The user interface 301 provides a facility whereby a user is able to understand and/or control a computational computing activity implemented in the distributed computing system. The graph engine 303 is arranged to provide a dynamic mapping between a local view of a distributed computing graph and the distributed computing graph itself. More detail about local views is given below. The optional visualization component 302 is arranged to enable results of a computational computing activity to be presented at the user interface.

Figure 4:
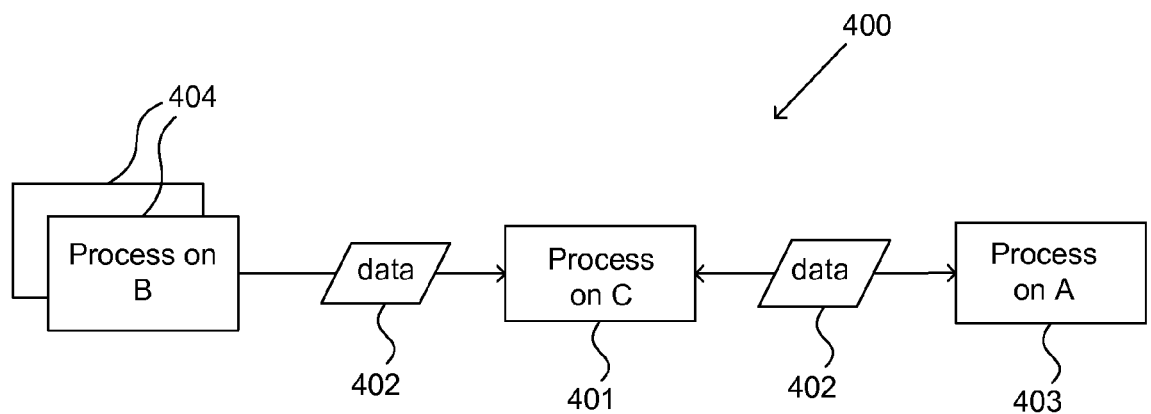
FIG. 4 is an example of a distributed computing graph.

FIG. 4 is a schematic diagram of a distributed computing graph 400 comprising nodes 401-404 connected by links. At least some of the nodes represent processes carried out at specified entities in a distributed computing system. For example, node 403 represents a process carried out at machine A 101 of FIG. 1; node 401 represents a process carried out at machine C of FIG. 1 and nodes 404 represent processes carried out at machine B of FIG. 1. Nodes 402 represent processes to retrieve or format data from specified sources for example.

Figure 5:
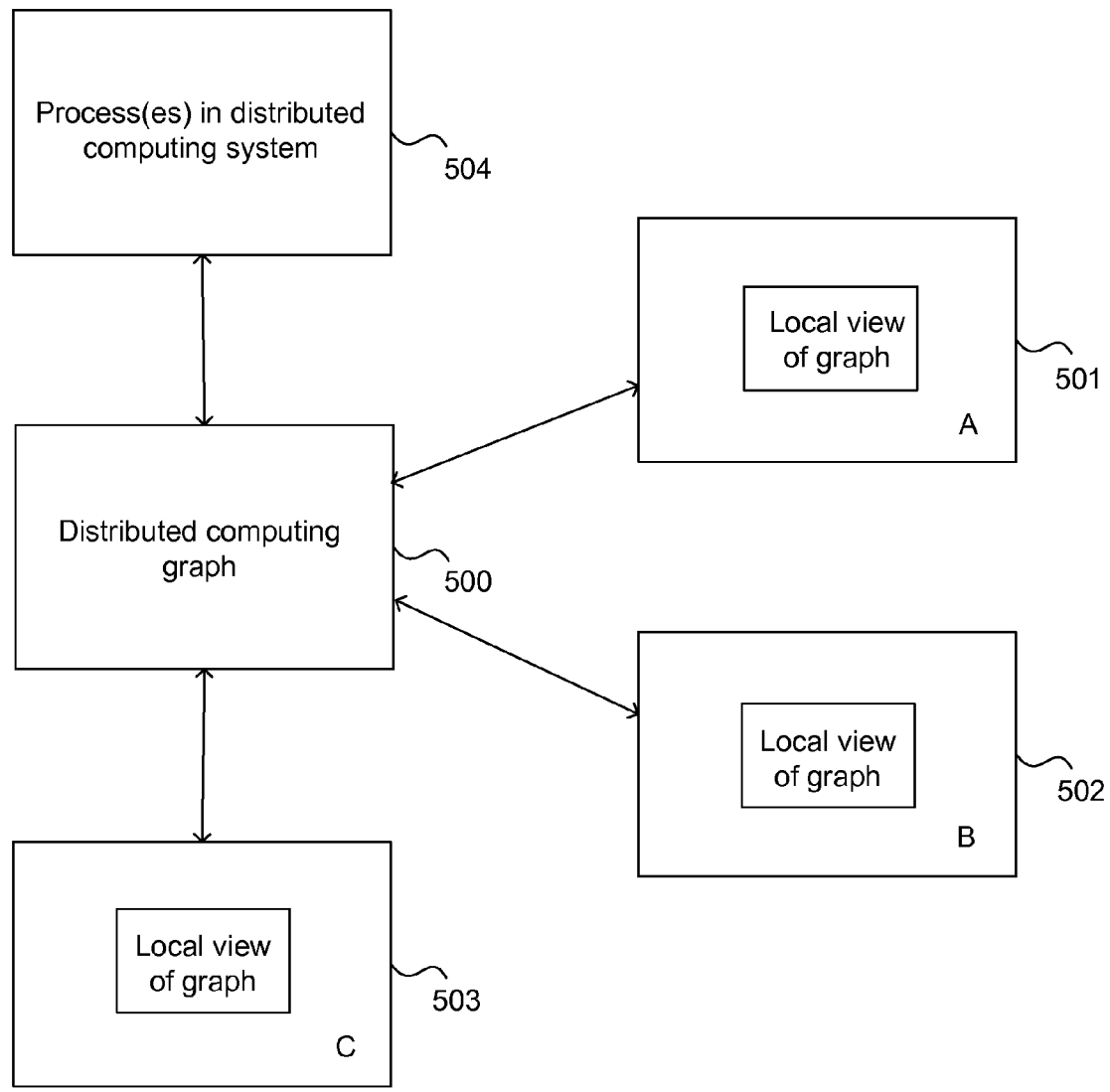
FIG. 5 is a schematic diagram of a distributed computing graph and local views of that graph.
Figure 6:
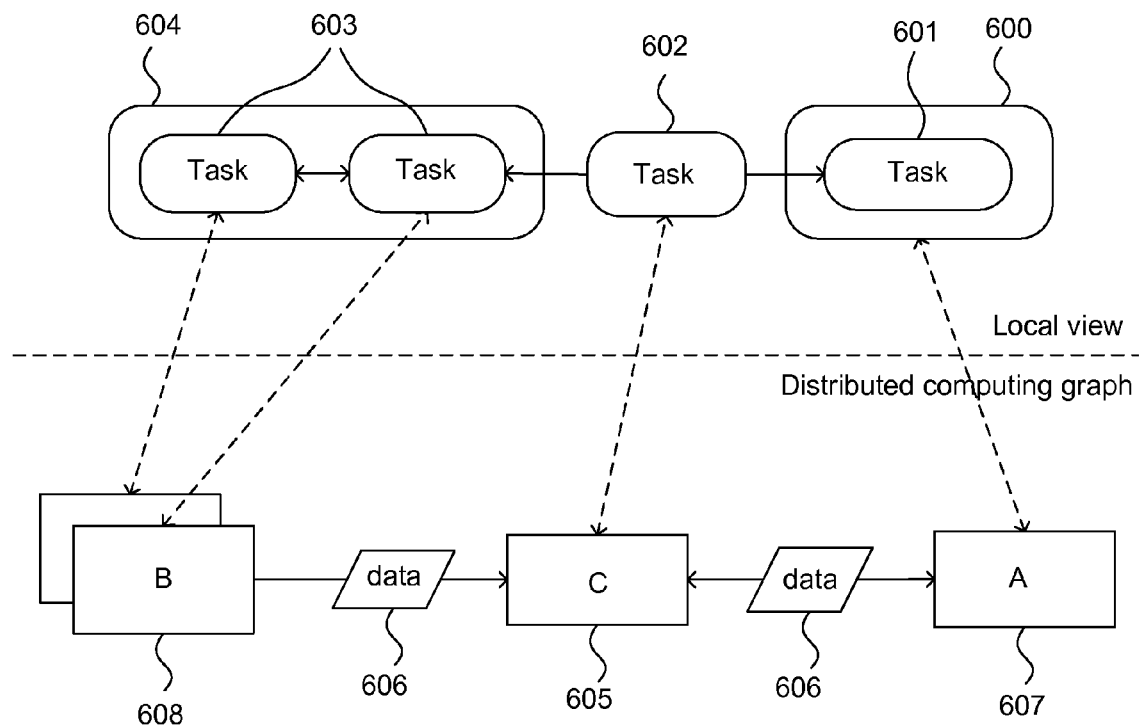
FIG. 6 is a schematic diagram of a another distributed computing graph and a local view of that graph.

FIG. 5 is a schematic diagram of a distributed computing graph 500 and local views 501, 502, 503 of that graph. The distributed computing graph 500 is arranged to control processes 504 in a distributed computing system as described above. Entities in the distributed computing system have access to the distributed computing graph and form their own local views of this graph. Also, each participant in an activity has access to the associated distributed computing graph even if that participant does not host any parts of that activity. For example, FIG. 6 shows a distributed computing graph (lower part of FIG. 6) and a corresponding local view of that graph (upper part of FIG. 6). The local views are dynamically updated in order that they correspond to the distributed computing graph in the event that any changes occur in the distributed computing graph. Also, if a change is made at a local view of the distributed computing graph this change is dynamically updated in the distributed computing graph itself and so is updated in local views at each of the entities in the distributed computing system. That is, each local view always reflects changes made by others in the distributed computing system.

As mentioned above, each participant in an activity has access to the associated distributed computing graph even if that participant does not host any parts of that activity. For example, a participant may require only to view the output of an experiment. In this case the participant connects to the distributed computing graph concerned but does not provide any input data, storage, processing capabilities or other resources for sharing.

The distributed computing graph in FIG. 6 comprises a node 607 representing a process carried out at entity A that uses data represented by a node 606. It also comprises nodes 608 representing processes carried out at entity B using data represented by a node 606. Another node 605 represents a process at entity C using data from nodes 606.

The local view from entity C comprises user interface elements 601, 602, 603 connected by links. User interface element 602 represents node 605 of the distributed computing graph. Because this node 605 is associated with a process occurring at entity C itself the corresponding user interface element 602 is not enclosed in an outer region. In contrast, user interface element 601 which represents the process at A is enclosed in an outer region 600 to indicate that entity A is remote of the local entity C. Similarly, user interface elements 603 which represent processes at B are enclosed in an outer region 604 to indicate that entity B is remote of the local entity C. In this way different instances or "local views" of the distributed computing graph are able to run at the same time on different computers. This enables different entities in a distributed computing system to investigate the same activity at the same time but each in a manner appropriate to that entity's point of view.

Figure 7:
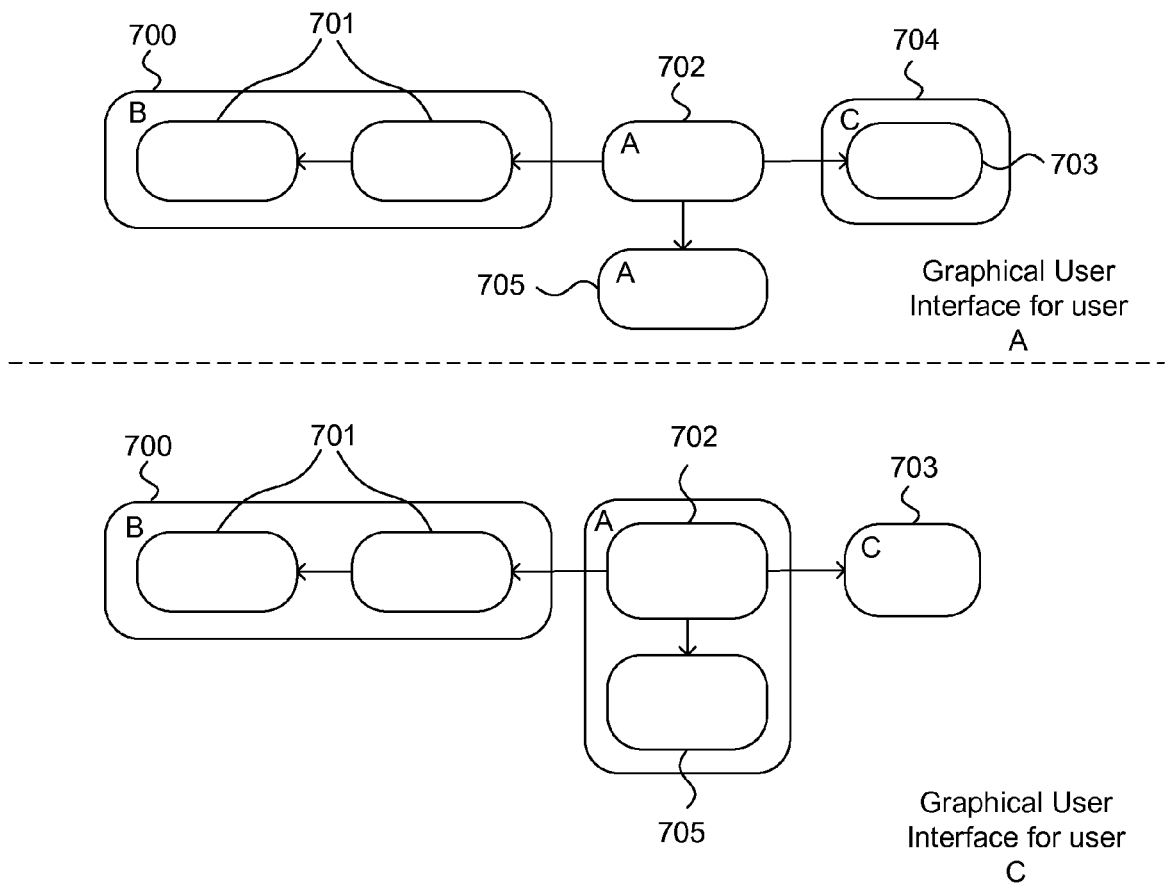
FIG. 7 is a schematic diagram of two different local views of the same distributed computing graph.

FIG. 7 is a schematic diagram of two different local views of the same distributed computing graph. The upper part of FIG. 7 shows the local view at entity A and the lower part of FIG. 7 shows the local view at entity C. The local view at entity A comprises user interface elements 701 representing processes at entity B which is remote as indicated by region 700. Entity B 700 may be more than one computer and/or may be another community. The tasks 701 may run at any location in entity B. It also comprises user interface element 703 representing process at entity C which is remote as indicated by region 704. The other user interface elements 702, 705 represent processes at A and these are not remote and so are not enclosed in outer regions.

The view from entity C is different in that the processes 702, 705 at A are now remote and so are enclosed in an outer region. Also, the process 703 at C is no longer remote and so is not enclosed in an outer region.

Figure 8:
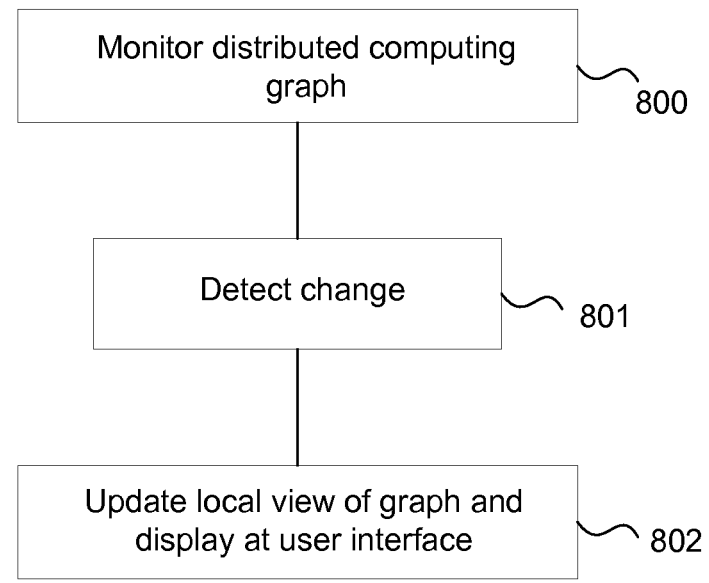
FIG. 8 is a flow diagram of a method at an entity in a distributed computing system.
Figure 9:
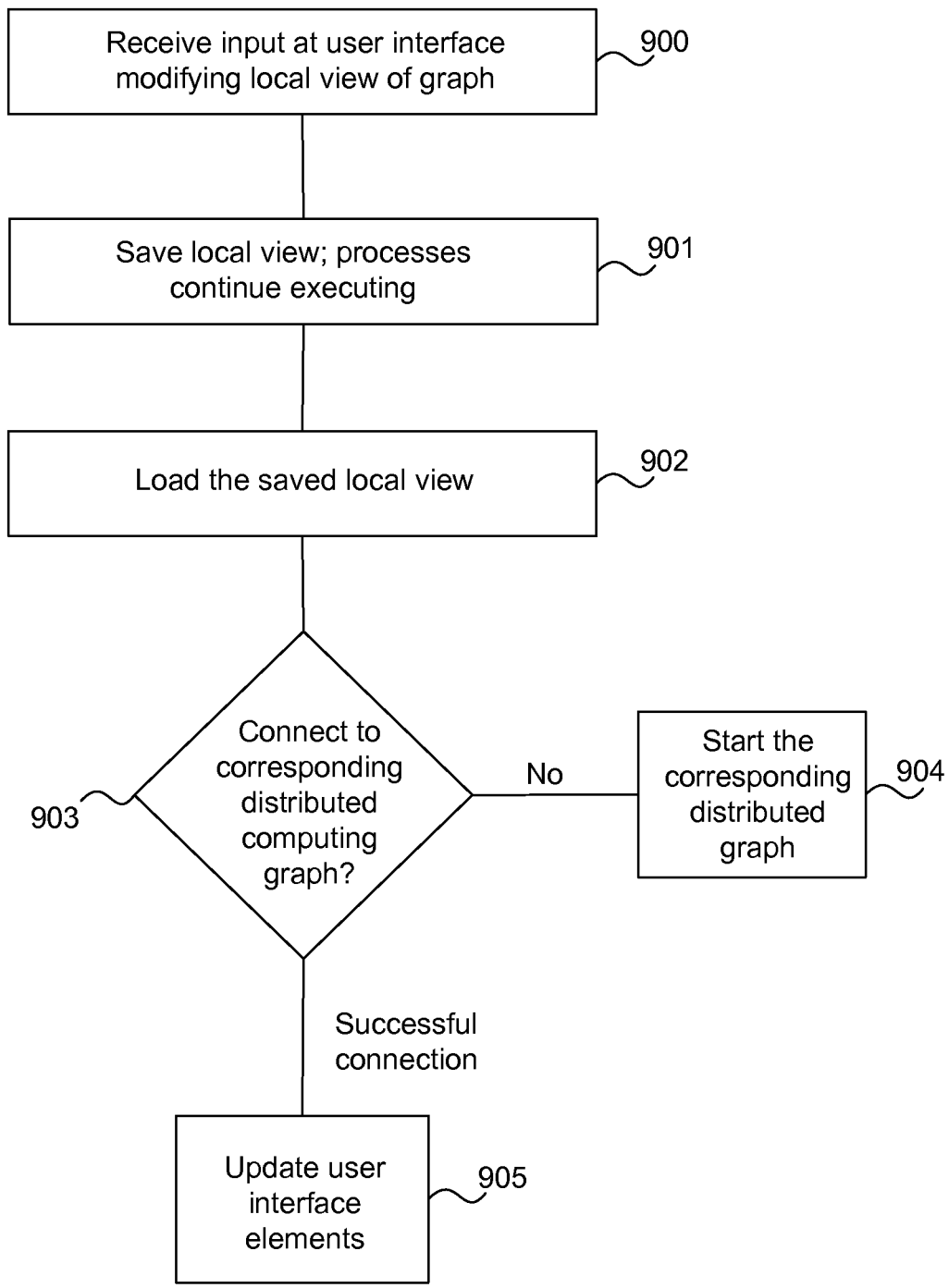
FIG. 9 is a flow diagram of a method of saving and loading a local view of a distributed computing graph.

An entity in the distributed computing system is arranged to monitor the distributed computing graph as illustrated in FIG. 8 at step 800. For example, the graph is replicated at entities in the distributed computing system using any suitable process and/or the graph is shared using a peer-to-peer distribution system. If the entity detects 801 a change in the graph then it updates its local view of the graph and displays that updated local view at a user interface associated with the entity. It is arranged to react to changes in the distributed computing graph.

The user interface 301 is informed of changes in the local view of the distributed computing graph by the graph engine 303 using any suitable notification mechanism.

The entities in the distributed computing system propagate their changes to one another in any suitable manner. For example, this may be implemented using a data synchronization system using any suitable data feed or using a peer-to-peer mechanism.

For example, if a new computational task is added to the distributed computing system at another entity then the change is actively propagated in the distributed computing graph. Information about the change (e.g. the new task) may then be provided at the user interface by updating the local view of the graph. As mentioned above, this may be achieved by a notification mechanism between the graph engine 303 and user interface 301. Also, if certain tasks become unavailable perhaps due to faults (temporary or permanent) in the distributed computing system then notification of this is available at entities in the distributed computing system through the local views of the graph.

A user at an entity is able to modify the local view of the distributed computing graph at that entity in order to control and/or manage the distributed computing system. For example, as now described with reference to FIG. 8 an entity in the distributed computing system receives 900 user input at its user interface modifying a local view of the distributed computing graph. The entity saves 901 this local view in memory and continues to execute processes as specified by the distributed computing graph. That is, all the underlying computing tasks continue executing both for local and remote processes. The entity loads 902 the saved local view of the distributed computing graph and compares the saved local view with the current distributed computing graph to identify changes. The entity then attempts 903 to connect to an entity or task in the distributed computing graph corresponding to the saved local view. As mentioned above, whether two tasks are able to connect (or communicate) may be specified by details in the wrappers.

If such a corresponding graph cannot be found and no connection can be established, then the entity starts 904 the corresponding distributed computing graph. That is, it triggers the start of any processes that are specified in the graph as being local to the entity and also triggers the start of any other processes. In this way, if the local entity is willing to share resources (such as computing cycles) then those resources are made available to the overall distributed computing system. In this way no "play" or "run" button is required for activation by a user. Rather an activity executes automatically and this simplifies operation for end users and makes the system suitable for operation by novices who have little or no knowledge of the distributed computing system being used.

If the connection is successfully established then the entity proceeds to update 905 the user interface elements according to the distributed computing graph to which it has connected. For example, the entity indicates whether any tasks in the graph are not running or are unavailable. It may indicate whether any tasks are no longer part of the distributed computing graph. Also, it may indicate whether any newly available tasks are present.

In some embodiments a plurality of local views of the same activity are available at the same physical machine. For example, this may be the case where a virtual machine operates at the physical machine and where multiple processors are available at the physical machine.

Figure 10:
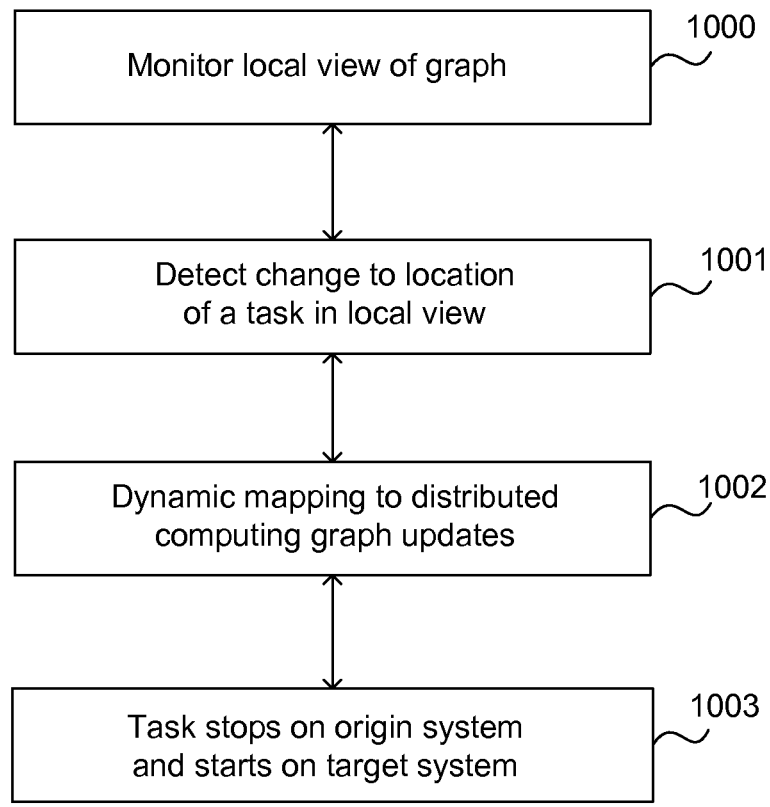
FIG. 10 is a flow diagram of another method at an entity in a distributed computing system.
Figure 11:
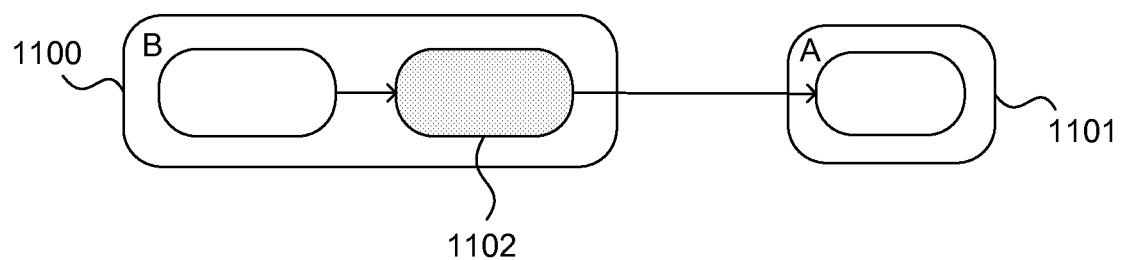
FIG. 11 is a schematic diagram of a local view of a distributed computing system before and after moving a task.
Figure 11:
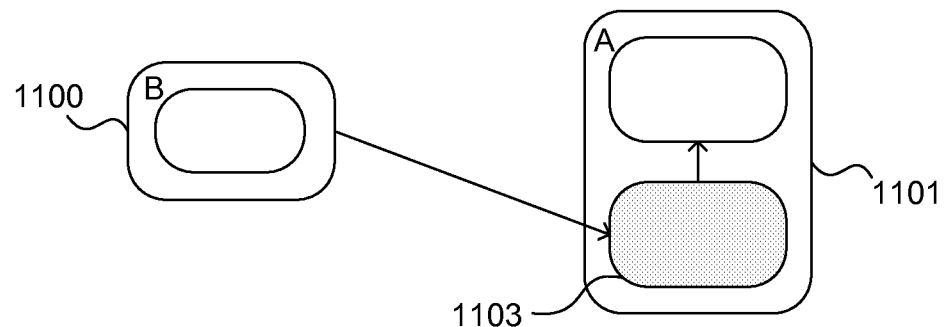

A user is able to make changes to a local view of the distributed computing graph in order to manage the distributed computing system. For example with reference to FIG. 10, an entity in the distributed computing system monitors 1000 its local view of the distributed computing graph and detects 1001 any change to the location of a user interface element representing a task in that local view. The dynamic mapping between the local view and the distributed computing graph occurs 1002 and the entity stops 1003 the task on that task's origin system and starts it on a target system for the task. This is illustrated with respect to FIG. 11 which shows a local view before moving a task from entity B to entity A (upper part of FIG. 11) and a local view after that change (lower part of FIG. 11). Before the change the local view shows user interface elements for two tasks one of which is shaded 1102 on remote entity B 1100 and shows one task 1101 on remote entity A. The shaded task is moved to entity A by dragging and dropping the user interface element onto the region for entity A as illustrated at 1103 in FIG. 11. When moving the task to entity A it is not specified on which physical entity within entity 1101 the task should be executed. For example, entity 1101 may comprise a cluster of physical entities or another community. The dynamic mapping between the local view and the distributed computing graph occurs and this enables live interaction with the distributed computing system itself. For example, there is no need to stop the activity before making modifications to that activity and no need to carry out any compilation or recompilation of processes.

Figure 12:
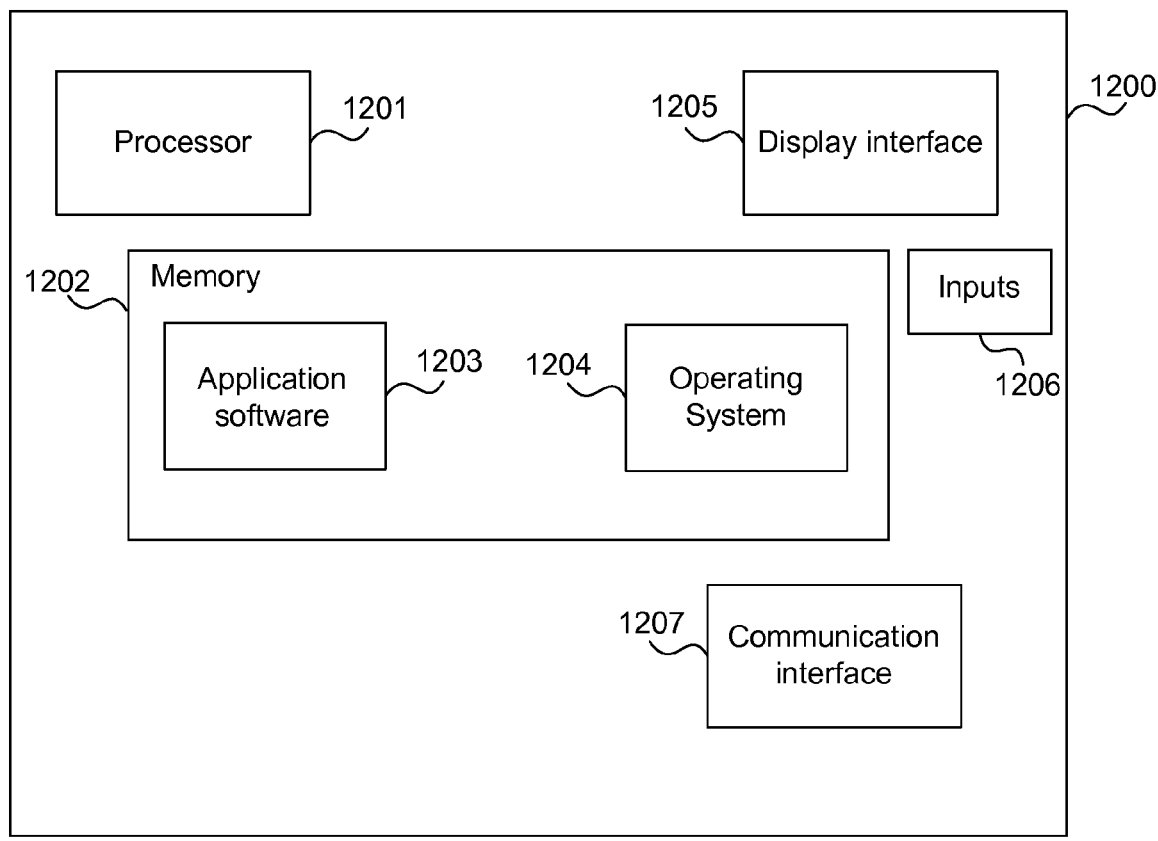
FIG. 12 illustrates an exemplary computing-based device in which embodiments of a node for use in a distributed computing system may be implemented.

FIG. 12 illustrates various components of an exemplary computing-based device 1200 which may be implemented as any form of a computing and/or electronic device, and in which embodiments of an entity in a distributed computing system may be implemented.

The computing-based device 1200 comprises one or more inputs 1206 which are of any suitable type for receiving media content, Internet Protocol (IP) input, or any input from other entities in a distributed computing system of which the entity is part. The device also comprises communication interface 1207 to enable the device to communicate with other entities in a communications network.

Computing-based device 1200 also comprises one or more processors 1201 which may be microprocessors, controllers or any other suitable type of processors for processing computing executable instructions to control the operation of the device in order to operate as an entity in a distributed computing system. Platform software comprising an operating system 1200 or any other suitable platform software may be provided at the computing-based device to enable application software 1203 to be executed on the device.

The computer executable instructions may be provided using any computer-readable media, such as memory 1202. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. The display system may be controlled using a display interface 1205 which may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method at an entity in a distributed computing system, the method comprising:
   providing an input arranged to connect to the distributed computing system and access a distributed computing graph associated with an activity to be carried out in the distributed computing system, the distributed computing graph representing currently executing processes in the distributed computing system;
   arranging a processor to provide a dynamic mapping between the distributed computing graph and a data structure at the entity holding a local view of the distributed computing graph such that changes in the distributed computing graph are reflected in the local view; and
   providing a user interface enabling control of the activity by modifying the local view based on input received at the user interface which modifies the local view, the local view indicating which processes represented by the distributed computing graph are executed at the entity and which processes are executed remote of the entity,
   the method further comprising:
      receiving input at the user interface which modifies the local view and wherein the method comprises using the dynamic mapping between the local view and the distributed computing graph to update the distributed computing graph according to the modified local view in order to control the activity;
      receiving user input specifying a second local view, attempting to connect to a distributed computing graph corresponding to the second local view and if successful updating the second local view according to the corresponding distributed computing graph; or
      receiving user input specifying the second local view, attempting to connect to the distributed computing graph corresponding to the second local view and if unsuccessful starting a new distributed computing graph corresponding to the second local view.

2. A method as claimed in claim 1 wherein the step of accessing the distributed computing graph comprises accessing a plurality of nodes connected by links where at least some of the nodes represent any of computational processes and data sources at one or more entities in the distributed computing system.

3. A method as claimed in claim 1 which comprises arranging the processor to provide the dynamic mapping such that changes in the local view are reflected in the distributed computing graph.

4. A method as claimed in claim 1 which comprises providing a peer-to-peer content distribution mechanism at the entity for distribution of the distributed computing graph within the distributed computing system.

5. A method as claimed in claim 1 which comprises arranging the input to access the distributed computing graph using a replication mechanism for replicating the distributed computing graph at the entities in the distributed computing system.

6. A method as claimed in claim 1 which further comprises receiving input at the user interface which modifies the local view and wherein the method comprises using the dynamic mapping between the local view and the distributed computing graph to update the distributed computing graph according to the modified local view in order to control the activity.

7. A method as claimed in claim 1 which further comprises receiving user input specifying the second local view; attempting to connect to the distributed computing graph corresponding to the second local view and if successful updating the second local view according to the corresponding distributed computing graph.

8. A method as claimed in claim 1 which further comprises receiving user input specifying the second local view; attempting to connect to the distributed computing graph corresponding to the second local view and if unsuccessful starting the new distributed computing graph corresponding to the second local view.

9. A method at an entity in a distributed computing system having a plurality of entities in communication with one another, the method comprising:
   providing an input arranged to connect to the distributed computing system and access a distributed computing graph associated with an activity to be carried out using a plurality of the entities in the distributed computing system, the distributed computing graph representing currently executing processes in the distributed computing system;
   arranging a processor to provide a dynamic mapping between the distributed computing graph and a data structure at the entity holding a local view of the distributed computing graph such that changes in the distributed computing graph are reflected in the local view;
   providing a user interface enabling control of the activity by modifying the local view based on input received at the user interface which modifies the local view, the local view indicating which processes represented by the distributed computing graph are executed at the entity and which processes are executed remote of the entity; and
   providing a peer-to-peer content distribution mechanism at the entity for accessing the distributed computing graph at the input from the distributed computing system,
   the method further comprising:
      receiving input at the user interface which modifies the local view and wherein the method comprises using the dynamic mapping between the local view and the distributed computing graph to update the distributed computing graph according to the modified local view in order to control the activity;

receiving user input specifying a second local view, attempting to connect to a distributed computing graph corresponding to the second local view and if successful updating the second local view according to the corresponding distributed computing graph; or receiving user input specifying the second local view, attempting to connect to the distributed computing graph corresponding to the second local view and if unsuccessful starting a new distributed computing graph corresponding to the second local view.

10. A method as claimed in claim 9 wherein the step of accessing the distributed computing graph comprises accessing a plurality of nodes connected by links where at least some of the nodes represent any of computational processes and data sources at one or more entities in the distributed computing system.

11. A method as claimed in claim 9 which comprises arranging the processor to provide the dynamic mapping such that changes in the local view are reflected in the distributed computing graph.

12. A method as claimed in claim 9 which further comprises receiving input at the user interface which modifies the local view and wherein the method comprises using the dynamic mapping between the local view and the distributed computing graph to update the distributed computing graph according to the modified local view in order to control the activity.

13. A method as claimed in claim 9 which further comprises receiving user input specifying the second local view; attempting to connect to the distributed computing graph corresponding to the second local view and if successful updating the second local view according to the corresponding distributed computing graph.

14. A method as claimed in claim 9 which further comprises receiving user input specifying the second local view; attempting to connect to the distributed computing graph corresponding to the second local view and if unsuccessful starting the new distributed computing graph corresponding to the second local view.

15. A distributed computing system comprising:
a plurality of entities in communication with one another, at least one of the Plurality of entities including a processor, using a communications network, each entity comprising at least one computing resource; and
a distributed computing graph, stored in the distributed computing system, the graph being associated with an activity to be carried out in the distributed computing system, the distributed computing graph representing processes associated with the activity at least some of which are currently executing in the distributed computing system, wherein:
each of the entities is arranged to provide a dynamic mapping between the distributed computing graph and a data structure at that entity holding a local view of the distributed computing graph such that changes in the distributed computing graph are reflected in the local view; and
at least some of the entities are arranged to provide a user interface which enables a user to control the activity by modifying the local view,
the at least some of the entities being further arranged to:
receive input at the user interface which modifies the local view and wherein the method comprises using the dynamic mapping between the local view and the distributed computing graph to update the distributed computing graph according to the modified local view in order to control the activity;
receive user input specifying a second local view, attempting to connect to a distributed computing graph corresponding to the second local view and if successful updating the second local view according to the corresponding distributed computing graph; or
receive user input specifying the second local view, attempting to connect to the distributed computing graph corresponding to the second local view and if unsuccessful starting a new distributed computing graph corresponding to the second local view.

16. A distributed computing system as claimed in claim 15 wherein at least some of the entities are arranged to provide a user interface based on the local view at that entity; the local view indicating which processes represented by the distributed computing graph are executed at the entity and which processes are executed remote of the entity.

17. A distributed computing system as claimed in claim 15 wherein each entity is arranged to provide the dynamic mapping such that changes in the local view are implemented in the distributed computing graph.

18. A distributed computing system as claimed in claim 15 wherein each entity comprises a peer-to-peer content distribution mechanism for distribution of the distributed computing graph within the distributed computing system.

19. A distributed computing system as claimed in claim 15 wherein each entity comprises a replication mechanism for replicating the distributed computing graph at the entities in the distributed computing system.

* * * * *